Jan. 11, 1938.   H. J. FLEMING   2,105,316
TIRE CUTTING MACHINE
Filed June 25, 1935   4 Sheets-Sheet 1

INVENTOR.
HERBERT J. FLEMING
BY
G. E. Wilson
ATTORNEY.

Jan. 11, 1938.　　　H. J. FLEMING　　　2,105,316
TIRE CUTTING MACHINE
Filed June 25, 1935　　　4 Sheets-Sheet 2

INVENTOR.
HERBERT J. FLEMING
BY G. E. Wilson
ATTORNEY.

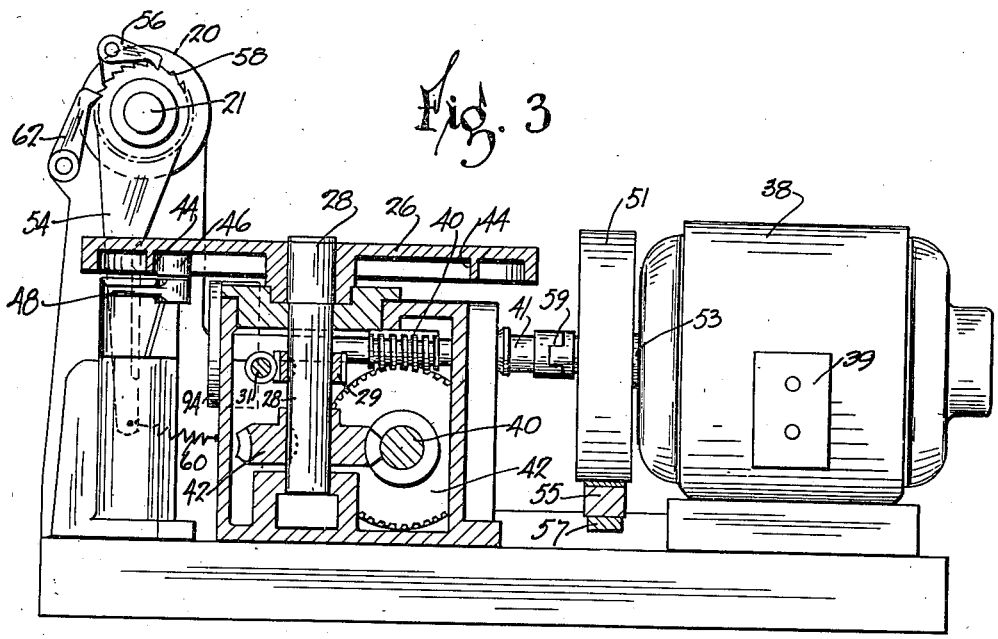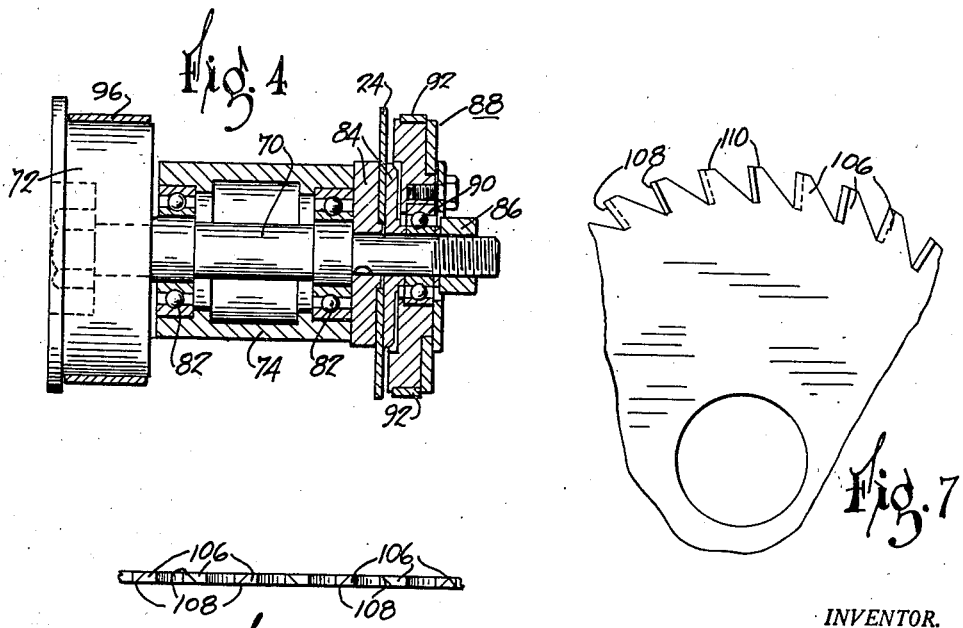

Jan. 11, 1938.   H. J. FLEMING   2,105,316
TIRE CUTTING MACHINE
Filed June 25, 1935   4 Sheets-Sheet 4
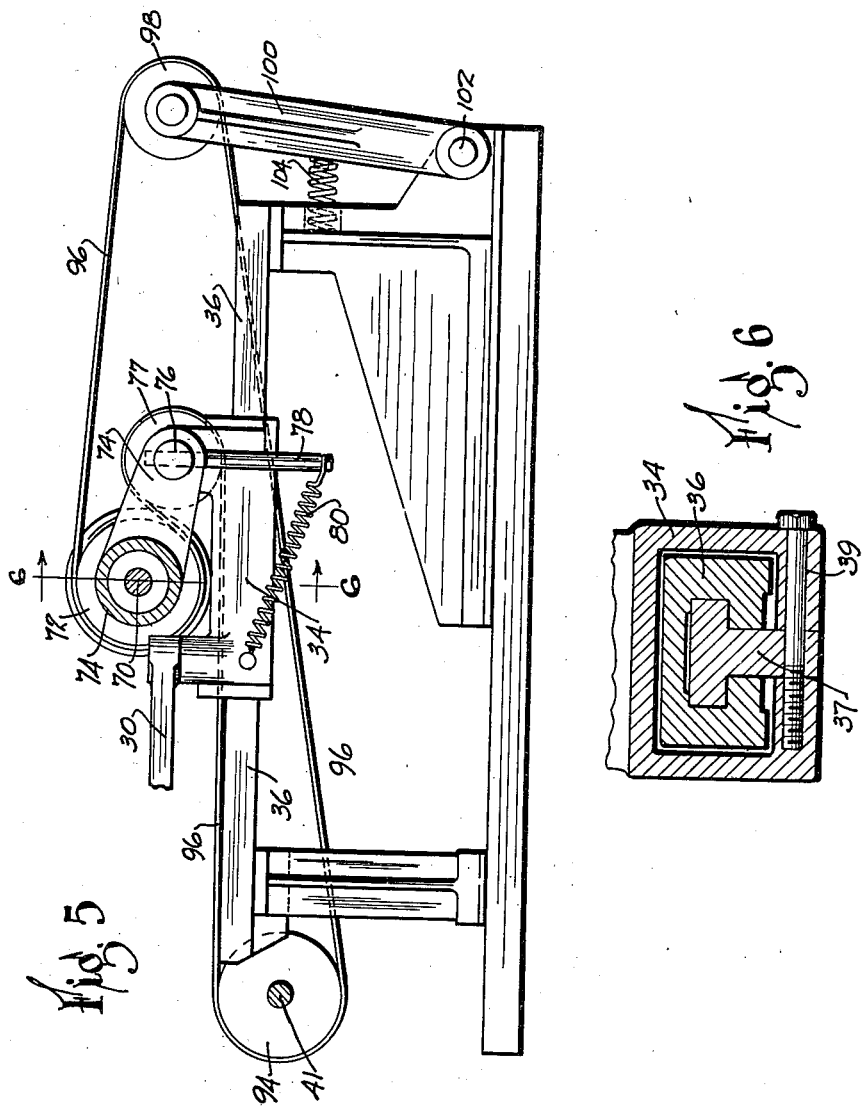
INVENTOR.
HERBERT J. FLEMING
BY
*J. E. Wilson*
ATTORNEY.

Patented Jan. 11, 1938

2,105,316

UNITED STATES PATENT OFFICE 2,105,316

TIRE CUTTING MACHINE

Herbert J. Fleming, South Bend, Ind., assignor to Bendix Products Corporation, South Bend, Ind., a corporation of Indiana Application June 25, 1935, Serial No. 28,320

14 Claims. (Cl. 90—15.1)

This invention relates to a machine adapted to decrease the skidding characteristics of vehicle tires, and more particularly to a novel machine adapted to cut incisions in the road engaging surface of vehicle tires.

An object of this invention is therefore to provide a novel machine whereby incisions may be cut in the road engaging surface of a tire to improve the gripping qualities of the tire.

A further object of the invention is to provide means whereby incisions may be cut in vehicle tires without removing them from the vehicle.

Another object is to provide a machine for treating tires wherein parallel slots may be cut in the tires as the cutter is moved in both directions across the road engaging surface of the tires.

A still further object is to provide a machine adapted to cut incisions or slots of uniform depth in the outer carcass of a tire, regardless of the outer contour of the carcass.

Yet a further object of the invention is to provide a novel drive mechanism wherein a single source of power is employed to rotate the cutting element, to move the cutting element transversely across the road engaging surface of the tire, and to index the tire preparatory to the next cycle of operation each time the cutting element is moved out of engagement with the tire.

Another object of the invention is to provide a machine of simple design adapted to treat all sizes of tires, which may be manufactured and operated economically.

Other desirable constructional features and advantages of this invention relate to an improved cutter tooth form; the use of an air or water spray to keep the cutting element clean; the use of a travelling belt drive to rotate the cutting element as it is moved transversely across the tire; the use of a manually operable brake to stop the cutting operation at any desired time; the use of guide rollers adapted to engage the tire to hold it securely in place, and the use of a flywheel to smooth out motor torque and to supply more uniform power to the cutting element.

Other objects and advantages of this invention will be apparent from the following detailed description, considered in connection with the accompanying drawings, submitted for purposes of illustration only, and not intended to define the scope of the invention, reference being had for that purpose to the subjoined claims.

In the drawings, wherein similar reference characters refer to similar parts throughout the several views:

Figure 3 is a view taken on the line 3—3 of Figure 2;

Figure 4 is a view taken on the line 4—4 of Figure 2;

Figure 5 is a view taken on the line 5—5 of Figure 2;

Figure 6 is a view taken on the line 6—6 of Figure 5;

Figure 7 is a view in side elevation of a portion of the cutting element shown in Figures 1, 2, 4, and 5; and Figure 8 is a top plan view of Figure 7.

Figure 1 illustrates one desirable embodiment of the invention wherein a vehicle tire 10 carried by a wheel 12 is mounted in operative position on a tire slotting machine embodying the present invention.

Figure 1:
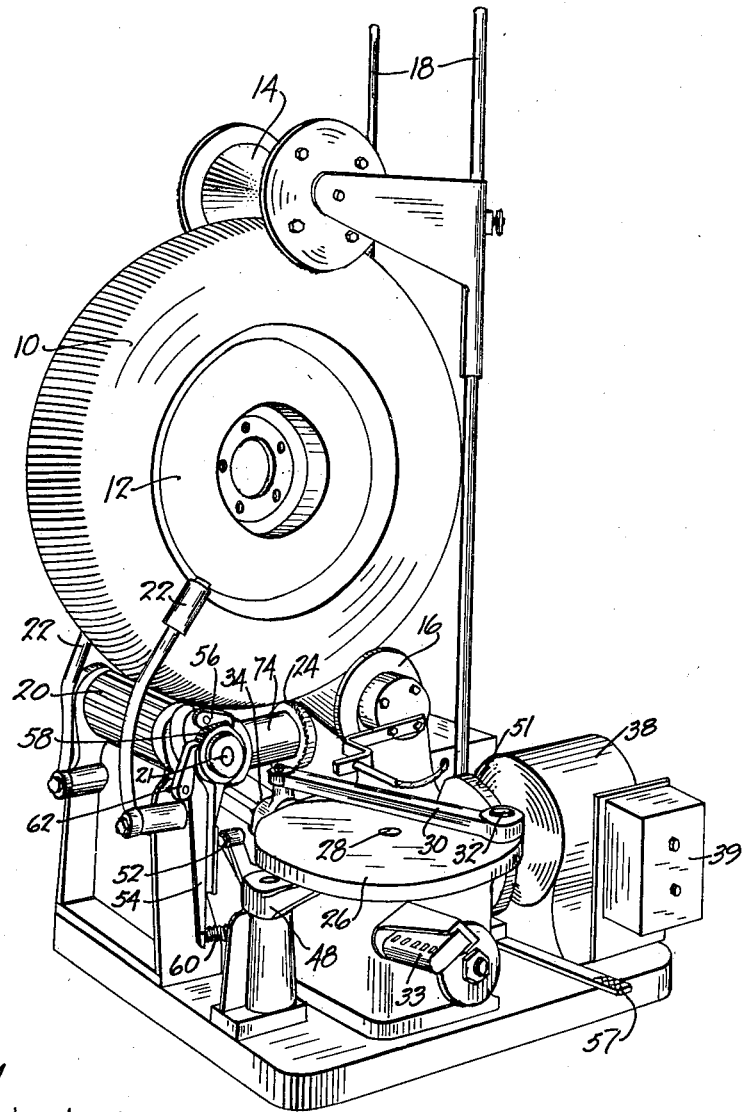
Figure 1 is a perspective view of a machine embodying the present invention.
Figure 2:
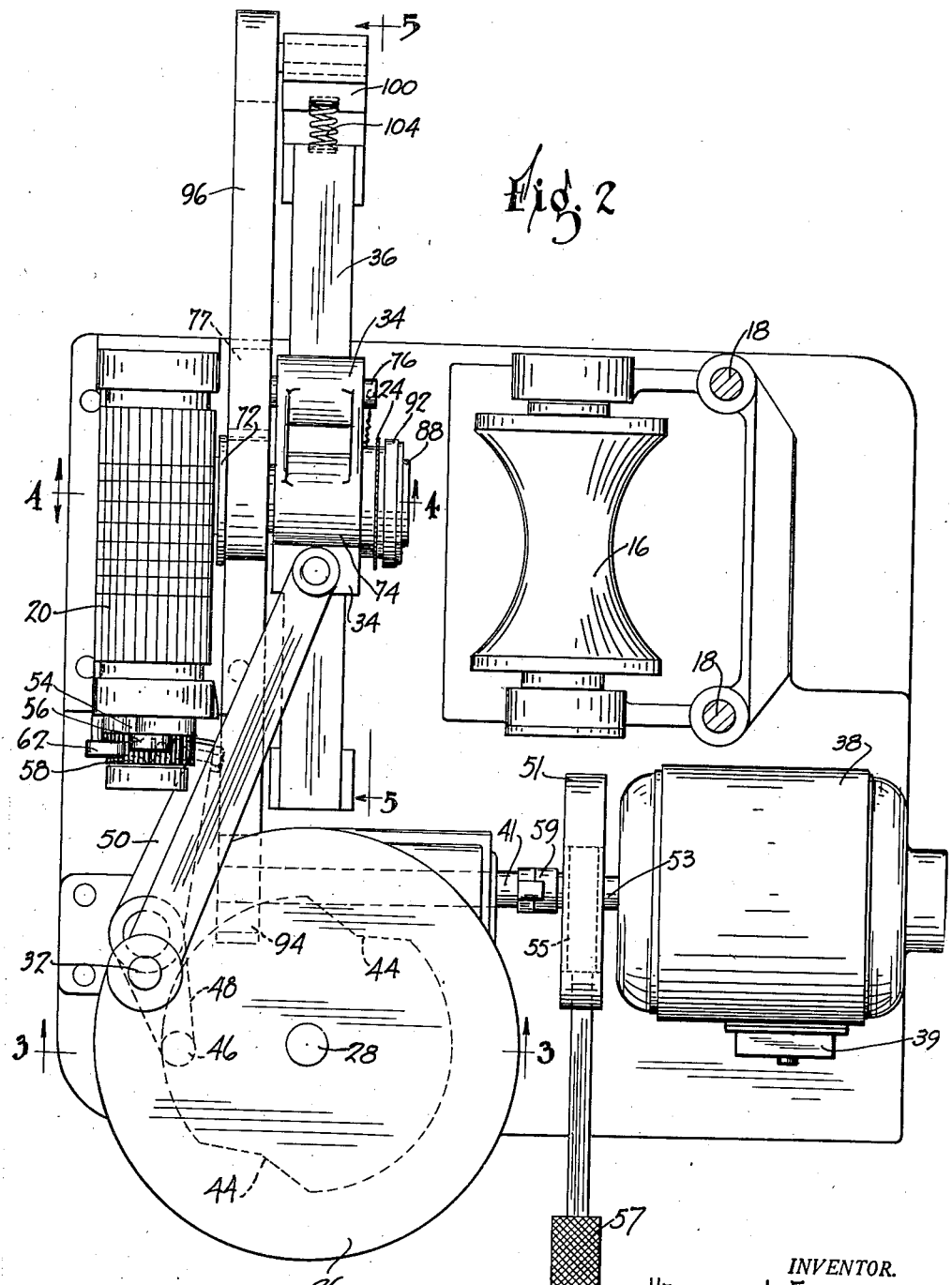
Figure 2 is a plan view of Figure 1.

As illustrated the tire 10 is positioned between upper and lower idler rollers 14 and 16 respectively. The upper roller 14 is adjustable vertically on the shafts 18 to accommodate tires of various diameters, and to press the lower surface of the tire into engagement with an indexing roller 20. The tire is held in the center of the indexing roller 20 by means of a pair of guide arms 22 adapted to engage the side walls of the tire.

Parallel transverse slots are cut in the road engaging surface of the tire by means of a saw blade 24, positioned between the idler roller 16 and the indexing roller 20. The saw blade 24 is moved back and forth across the face of the tire by a linkage including a rotatable plate 26 mounted on a shaft 28 and a connecting rod 30 interconnecting a pin 32 fixed in one side of the plate 26 with a slide 34 adapted to move on the guide 36.

The plate 26 is rotated by an electric motor or other suitable source of power 38 through suitable reduction gears, shown in the illustrative embodiment as comprising the worm gears 40 and the worm wheels 42.

The lower surface of the plate 26 is hollow to form a pair of diametrically opposed cam surfaces 44. The cam surfaces 44 engage a roller 46 carried by one arm of bell crank 48. The other end 50 of the crank 48 is provided with an adjustable stop 52 adapted to engage a lever 54 rotatably mounted on the indexing roller shaft 21. The lever 54 carries a pawl 56 adapted to engage a ratchet wheel 58 fixed to the shaft 21 to rotate the indexing roller 20 each time the arm 46 rides over one of the cam surfaces 44.

The lever 54 is returned to its normal position by a spring 60. The indexing roller 20 is prevented from rotating with the lever 54 by a locking pawl 62 adapted to engage the ratchet wheel 58 under certain operating conditions.

The saw 24 is mounted on a driven shaft 70 having a pulley 72 fixed to one end thereof. The shaft 70 is surrounded by a housing 74, pivotally connected to a shaft 76 carried by the slide 34. The housing 74 is provided with an idler roller 77 and a depending lever 78 which receives one end of a spring 80. The other end of the spring 80 is fixed to a remote point on the slide 34. The spring 80 yieldingly urges the housing and the saw 24 to rotate in the clockwise direction, as viewed in Figure 5, about the shaft 76.

The shaft 70 rotates in bearings 82 positioned in the housing 74. The saw 24 is clamped between a pair of plates 84 by means of a nut 86 threaded on the end of the shaft 70. A depth gauge 88, separated from the shaft 70 by bearings 90, contacts the road engaging surface of the tire to prevent the saw 24 from cutting beyond a predetermined depth. Means including a cylindrical spacer band 92 are provided to vary the depth of the cut in accordance with the condition of the tire being treated.

The shaft 41, driven by the motor 38, is provided with a pulley 94 adapted to drive a belt 96. The belt 96 passes over the idler roller 77 carried by the shaft 76, then reverses direction and passes over the pulley 72 fixed to the saw shaft 70. The belt then reverses direction again and passes over an idler roller 98 carried by a lever 100 pivotally mounted at 102, and yieldingly urged in a direction to hold the belt 96 taut by a spring 104.

It will be noted, as illustrated in Figures 7 and 8, that the teeth 106 of the saw 24 have sharply pointed leading edges 108 and flat radial outer projections 110. It has been found that this particular tooth form will produce a cleaner cut in the resilient material, of which tires are manufactured than other tooth forms.

The material cut from the face of the tire is removed by a blast of air and water directed against the cutter while in operation. The slide 34 and the guide 36 are formed as illustrated in Figure 6, wherein the slide 34 surrounds the guide 36, and is fixed to a flanged member 37 by bolts 39. The flanged member 37 slides in ways formed in the guide 36 as illustrated. A groove 43 formed in the guide 36 provides a space for a suitable quantity of lubricant to facilitate movement between the guide and slide. One of the chief advantages of this structure is that it is unnecessary for the slide 34 to engage the guide 36. Binding between the slide 34 and the guide 36 is therefore prevented, because if any of the cuttings from the road engaging surface of the tire should collect on the guide 36 they could not cause damage because they would be brushed away by the slide 34, it being impossible for them to collect between the flanged member 37 and the internal ways in the guide 36.

Means are provided to record the number of slots cut in a tire. The shaft 28 is provided with a pinion 29, which meshes with a worm gear 31 to drive a recording mechanism 33 to indicate the number of times the saw 24 moves across the tire.

A flywheel 51 is fixed to the power shaft 53 of the motor 38 to smooth out the torque of the motor 38 and to prevent excessive fluctuation in the speed of the driving motor as the saw 24 periodically disengages the tire 10.

Manually operable means are provided to stop the slotting operation at any desired time. A brake shoe 55 engages the outer periphery of the flywheel 53 when a foot lever 57 is actuated. It is thus possible to stop the slotting operation when the entire circumference of the tire has been slotted, without the possibility of double slotting any portion thereof.

It will be observed that any size tire may be slotted on this machine because the guide roller 14, mounted on the shafts 18, can be moved vertically to accommodate a tire of any diameter, and the guide arms 22 can be moved horizontally to accommodate a tire of any width.

The operation of this machine is as follows. When it is desired to slot the tires, the wheels 12 having the tires 10 mounted thereon are removed from the vehicle. The tires are placed on the idler roller 16 and the indexing roller 20. The idler roller 14 is then moved downwardly on the shafts 18 into engagement with the tire 12, whereupon the clamping studs 19 are tightened to hold the tire in operating position.

The motor 38 is then started by operating the switch 39. The power shaft 53 operates through the universal joint 59 to drive the shaft 41. Rotation of the shaft 41 operates through the worm gears and wheels 40 and 42 respectively and the shaft 28 to rotate the plate 26, and through the drive pulley 94 to drive the belt 96.

Rotation of the plate 26 operates through the connecting rod 30 to move the slide 34 with reference to the guide 36. As the slide 34 moves it carries with it the housing 74 pivotally mounted on the shaft 76 and the idler roller 77. The housing 74, supporting the saw 24 and the pulley 72, is yieldingly urged to rotate in the clockwise direction about the shaft 76 by the lever 78 and the spring 80. The saw 24 is therefore yieldingly urged into engagement with the road engaging surface of the tire 12 as it is moved transversely across the surface of the tire.

The belt 96, driven by the drive pulley 94, rotates the saw 24 to cut a slot in the tire as the saw is progressively moved across the surface of the tire. The idler pulley 98, carried by the lever 100, pivotally mounted at 102 and yieldingly urged to rotate in the clockwise direction by the spring 104, operates to keep the belt 96 taut. A travelling belt drive is thus provided.

As the saw 24 approaches either extreme position it moves out of engagement with the tire 12. One of the cams 44, carried by the plate 26, then engages the arm 46, carried by the bell crank 48, which operates through the end 50 of the crank 48, the adjustable stop 52, the lever 54, and the pawl 56 to rotate the indexing pulley 20, thereby rotating the tire 12 by an amount equal to the space between adjacent slots. Further rotation of the plate 26 operates to reverse the direction of travel of the housing 74 and the saw 24 to cut a slot in the tire as the saw is moved in the opposite direction by rotation of the plate 26.

This operation is continued, the saw automatically reversing direction of travel, and the indexing roller 20 rotating the tire 12 each time the pin 32, carried by the plate 26, approaches either extreme position.

The saw 24 is prevented from cutting a slot of more than a predetermined depth by the depth gauge 88 and the spacer band 92. When slotting tires that have a comparatively thin tread, a thicker spacer band 92 should be employed to prevent the saw 24 from cutting such a deep slot.

The saw 24, being yieldingly urged in the clockwise direction, as viewed in Figure 5, by the spring 80, follows the contour of the road engaging surface of the tire. Uniform depth of slotting over the entire surface of the tire is therefore assured.

When the entire circumference of the tire has been slotted, the operator may stop the machine by actuating the electric switch 39 and stepping on the foot lever 57. It is therefore easy to stop the slotting operation at the proper time so that all of the tire has been slotted but none double slotted.

It will be apparent of course that, if desired, the guide roller 16 and the indexing roller 20 may be positioned flush with the floor, so that the tires may be slotted without removing the wheels from the vehicle.

If desired, a gang cutter having a plurality of saws or other suitable cutting elements such as one or more slitting knives may be substituted for the single saw blade 24. It will be apparent that if a gang of cutters is employed the indexing roller 20 must be rotated so as to move the tire 10 in proper position for the next cycle of operation.

While the invention has been described with particular reference to a preferred embodiment, it is not intended to limit the scope of the invention to the features illustrated and described, nor otherwise than by the terms of the following claims.

I claim:

1. In a tire slotting machine, a tire having a road engaging surface, a single source of power, a cutting element, yielding means urging the cutting element into engagement with the tire, means to prevent the cutting element from cutting beyond a predetermined depth, means to move the cutting element transversely across the road engaging surface of the tire, a flywheel indexing means operated by said power means to rotate the tire a proper amount to receive the next cut when the cutting element approaches either extreme position, a manually operable brake associated with the flywheel to stop the machine.

2. A machine for cutting incisions in the road engaging surface of vehicle tires comprising a source of power, cutting means, means driven by the source of power to move the cutting means across the road engaging surface of the tire, indexing means driven by the source of power to rotate the tire when the cutting means approaches either extreme position, and a belt drive driven by the source of power to operate the cutting means.

3. A machine for cutting parallel slots in the road engaging surface of pneumatic vehicle tires comprising a source of power, cutting means, means including a cam driven by the source of power to move the cutting means across the road engaging surface of the tire, yielding means urging the cutting means into engagement with the tire, indexing means driven by the source of power to rotate the tire when the cutting means approaches either extreme position, a travelling belt drive driven by the source of power to operate the cutting means, adjustable means to prevent the cutting means from cutting beyond a predetermined depth, means to record the number of slots cut by the machine, and manually operable means to stop and start the machine.

4. In a machine, a single source of power, an idler roll and an indexing roll adapted to receive a pneumatic vehicle tire, an auxiliary adjustable roll adapted to engage the tire and hold the road engaging surface of the tire into contact with the indexing roll, cutting means positioned between the idler roll and the indexing roll and yieldingly urged into engagement with the tire, means to move the cutting means transversely across the road engaging surface of the tire, means to rotate the indexing roll to rotate the tire when the cutting means approach either extreme position, and a travelling belt drive driven by the source of power to actuate the cutting means.

5. In a machine, a source of power, an idler roll and an indexing roll adapted to receive a pneumatic vehicle tire, an auxiliary adjustable roll adapted to engage the tire and hold the road engaging surface of the tire into contact with the indexing roll, cutting means positioned between the idler roll and the indexing roll, means including a horizontally disposed plate driven by the power means and a connecting rod to move the cutting means transversely across the road engaging surface of the tire, cam means driven by the horizontally disposed plate to rotate the indexing roll to rotate the tire when the horizontal plate approaches a predetermined position, and a travelling belt drive driven by the source of power to actuate the cutting means.

6. A tire slotting device including power means, tire engaging means, indexing means operable by the power means to periodically rotate the tire a predetermined amount, transversely movable cutting means yieldingly urged into contact with the tire, a travelling belt drive to actuate the cutting means, a flywheel associated with the power means to render the speed of the power means uniform, a brake associated with the flywheel to stop the slotting device at any predetermined time, and means to record the number of slots cut by the slotting device.

7. A tire slotting device including power means, tire engaging means, indexing means operable by the power means to periodically rotate the tire a predetermined amount, transversely movable cutting means including a saw having teeth provided with pointed cutting surfaces and radial rounded full width projections yieldingly urged into contact with the tire, a travelling belt drive including a yielding slack adjustment to actuate the cutting means, a flywheel associated with the power means to render the speed of the power means uniform, a brake including manually operable means associated with the flywheel to stop the slotting device at any predetermined time, means to record the number of slots cut by the slotting device, and means to vary the depth of the slot cut in a tire.

8. In a tire slotting device adapted to cut transverse parallel slots in the tires of a vehicle while the tires are in place on the vehicle, single power means, means actuated by the power means to periodically rotate the tire a predetermined amount, a cutting element yieldingly urged into engagement with the tire and movable transversely with respect to the tire, a travelling belt drive driven by the power means to actuate the cutting element, and adjustable means to limit the depth of the slot cut in the tire.

9. A machine for treating the road engaging surface of tires having in combination idler and indexing rollers to receive a tire, means including a rotatable cutting element positioned between said rollers and adapted to treat the surface of the tire, and power means to actuate the cutting element and to actuate the indexing roller when the rotatable cutting element is not treating the surface of the tire.

10. In a tire cutting machine having indexing and idler means to receive a tire, a rotatable cutting element positioned between said rollers and movable with respect to the road engaging surface of the tire, means associated with the rotatable cutting element to control the depth of the cut, power means to drive the cutting elements and to actuate the indexing means when the cutting element is not in engagement with the road-engaging surface of the tire and a travelling belt drive between the power means and the cutting elements.

11. In a tire cutting machine having indexing and idler means to receive a tire, a plurality of cutting elements movable with respect to the road engaging surface of the tire and yieldingly urged into contact therewith, power means to drive the cutting elements and to actuate the indexing means, a flywheel driven by the power means, and a brake associated with the flywheel to stop the machine.

12. A machine for forming incisions in the road-engaging surface of a vehicle tire comprising a frame, a source of power, indexing means for the tire mounted on the frame and actuated by said source of power, rotatable cutting means on said frame adapted to be moved transversely of the tire surface, said cutting means including means for controlling the depth of cut, and means for traversing and rotating said cutting means actuated by said source of power, said last-named means including a member mounted coaxially with the cutting means and drivably connected thereto, and a flexible member having driving engagement with said coaxial member.

13. A machine for forming incisions in the road-engaging surface of a vehicle tire comprising a frame, means associated with the frame to support the tire, generally transversely movable means supported by the frame to engage the road-engaging surface of the tire to form said incisions, power means to actuate said transversely movable means, indexing means driven by the power means to move the road-engaging surface of the tire with reference to the transversely movable means when said incisions are not being formed, means associated with the transversely movable means to vary the depth of the incisions, and yielding means urging the transversely movable means into engagement with the road engaging surface of the tire.

14. In a tire treating machine, a base, a frame mounted on the base, means associated with the frame to support a tire, transversely movable rotatable means to cut incisions in the road-engaging surface of the tire, indexing means to move the tire with reference to the cutting means when the cutting means is not cutting incisions in the road-engaging surface thereof, power means to actuate the cutting and indexing means, and means associated with the cutting means to control the depth of cut.

HERBERT J. FLEMING.